United States Patent
Nash

(10) Patent No.: US 10,901,798 B2
(45) Date of Patent: Jan. 26, 2021

(54) DEPENDENCY LAYER DEPLOYMENT OPTIMIZATION IN A WORKLOAD NODE CLUSTER

(71) Applicant: International Business Machines Corporation, Armonk, NY (US)

(72) Inventor: Henry Nash, Clevedon (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/133,012

(22) Filed: Sep. 17, 2018

(65) Prior Publication Data

US 2020/0089542 A1 Mar. 19, 2020

(51) Int. Cl.
*G06F 9/50* (2006.01)
*G06F 11/34* (2006.01)
*G06F 11/30* (2006.01)

(52) U.S. Cl.
CPC ........ *G06F 9/5055* (2013.01); *G06F 11/3006* (2013.01); *G06F 11/3409* (2013.01)

(58) Field of Classification Search
CPC .......... G06F 8/60; G06F 8/61; G06F 11/3066; G06F 9/5055; H04L 67/10; H04L 41/0853
See application file for complete search history.

(56) References Cited

U.S. PATENT DOCUMENTS

| 5,721,824 A | 2/1998 | Taylor |
| 9,071,613 B2 | 6/2015 | Bailey et al. |
| 9,195,509 B2 | 11/2015 | Bartfai-Walcott et al. |
| 2006/0048145 A1 | 3/2006 | Celli et al. |
| 2008/0082978 A1* | 4/2008 | Or ........................ G06F 16/252 718/100 |
| 2008/0201705 A1* | 8/2008 | Wookey ................. G06F 8/658 717/175 |
| 2016/0261459 A1* | 9/2016 | Kamath .................. H04L 67/10 |
| 2016/0328273 A1 | 11/2016 | Molka et al. |
| 2016/0359705 A1* | 12/2016 | Parandehgheibi .. H04L 43/0811 |
| 2017/0093640 A1* | 3/2017 | Subramanian .......... H04L 41/12 |
| 2017/0206071 A1* | 7/2017 | Kirkpatrick ............... G06F 8/61 |
| 2017/0257432 A1* | 9/2017 | Fu ......................... G06F 9/5072 |
| 2018/0027058 A1 | 1/2018 | Balle et al. |
| 2018/0046446 A1* | 2/2018 | Turovsky ................. G06F 8/65 |
| 2019/0220266 A1* | 7/2019 | Doshi ................. G06F 11/1469 |

OTHER PUBLICATIONS

Yang, Juan, "Rebalancing for Efficency: Workload Placement within IBM Spectrum Symphony Multicluster," https://www.ibm.com/developerworks/community/blogs/46ecec34-bd69-43f7-a627-7c469c1eddf8/entry/How_to_use_SMC_to_do_workload_placement?lang=en, Nov. 30, 2017, pp. 1-10.

* cited by examiner

*Primary Examiner* — Dong U Kim
(74) *Attorney, Agent, or Firm* — Winstead PC

(57) ABSTRACT

A method, system and computer program product for dependency layer deployment optimization in a workload node cluster. Historical data of workload deployment requests to a workload node cluster and a list of dependency layers for the workload deployment request are maintained, where a dependency layer defines support programs on which a workload program depends. Furthermore, a map of currently deployed dependency layers across the nodes of the workload node cluster is maintained. The historical data is analyzed to generate predictions of dependency layers required in the workload node cluster at given times. Furthermore, dependency layers are deployed and/or reclaimed in the workload node cluster according to the predictions ahead of a workload deployment request requiring predicted dependency layers.

20 Claims, 6 Drawing Sheets

DEPENDENCY LAYER DEPLOYMENT OPTIMIZATION IN A WORKLOAD NODE CLUSTER

TECHNICAL FIELD

The present invention relates generally to workload node cluster management, and more particularly to dependency layer deployment optimization in a workload node cluster.

BACKGROUND

The use of virtual environments has significantly accelerated software deployment since they allow a much more rapid deploy of the platform on which the application will run. Prior to virtualization, deployments would often be stalled waiting for hardware to be installed and configured. Initially such virtual environments were essentially full virtual machines (i.e. containing an instance of the operating system, all middleware components and libraries as well as the developer application itself) running on a hypervisor. Such hypervisor-based virtualization can lead to inefficiencies both at run time (since a whole copy of the operating system is needed in every virtual machine) as well as deployment (since such virtual machines could be quite large).

Newer forms of virtualization such as containers and Platform-as-a-Services (PaaS) seek to lighten both these aspects by having to only deploy the minimum amount a "new code" while obtaining the rest (operations systems, libraries, middleware) from components already deployed for other applications.

Container-based virtualizations use an approach of defining the required components in layers, with those layers being deployable independently and in advance. Applications running inside a container can only see the container's contents and devices assigned to the container. Containers are building blocks for applications and each container is an image with a readable/writeable layer on top of read-only layers. These layers (also referred to as intermediate images) are generated when the commands are executed during an image build.

PaaS systems use an approach of packaging (also referred to as build packs) which allow the dependency components to be described and deployed in the system, and their application programing interfaces (APIs) are then available for use by the deployed application itself.

While these layers and packages are much faster to deploy than full virtual machines or actual hardware, they can still be a source of delay (from a few seconds to a few hours). Developers using containers and PaaS systems are often seeking to deploy applications very quickly (in some cases in fractions of a second), so a delay of even seconds can affect the lifecycle.

This delay can be a particular problem in large clusters, where numerous target deployment systems make up the cluster, but it is not practical for the layers or build-packs to be identical on each one, leading to different deployment speeds depending on which one was targeted.

The goal of a typical cluster is to appear as a single entity to its clients while, under-the-hood, it is ideally made up of horizontally scalable components so that the performance and/or reliability can be much larger than would be possible by a single node. The goals of clusters that support either container or PaaS deployments are no different. Unlike hypervisor clusters (which run complete virtual machines), each node in a container or PaaS clusters may need to contain many more layers of software in order to be able to execute the workload presented.

SUMMARY

In one embodiment of the present invention, a method for dependency layer deployment optimization in a workload node cluster comprises maintaining historical data of workload deployment requests to a workload node cluster and a list of dependency layers for the workload deployment request, where a dependency layer defines support programs on which a workload program depends. The method further comprises maintaining a map of currently deployed dependency layers across nodes of the workload node cluster. The method additionally comprises analyzing the historical data to generate predictions of dependency layers required in the workload node cluster at given times for future workload deployment requests. Furthermore, the method comprises deploying and/or reclaiming dependency layers in the workload node cluster according to the predictions ahead of a workload deployment request requiring predicted dependency layers.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Figure 1:
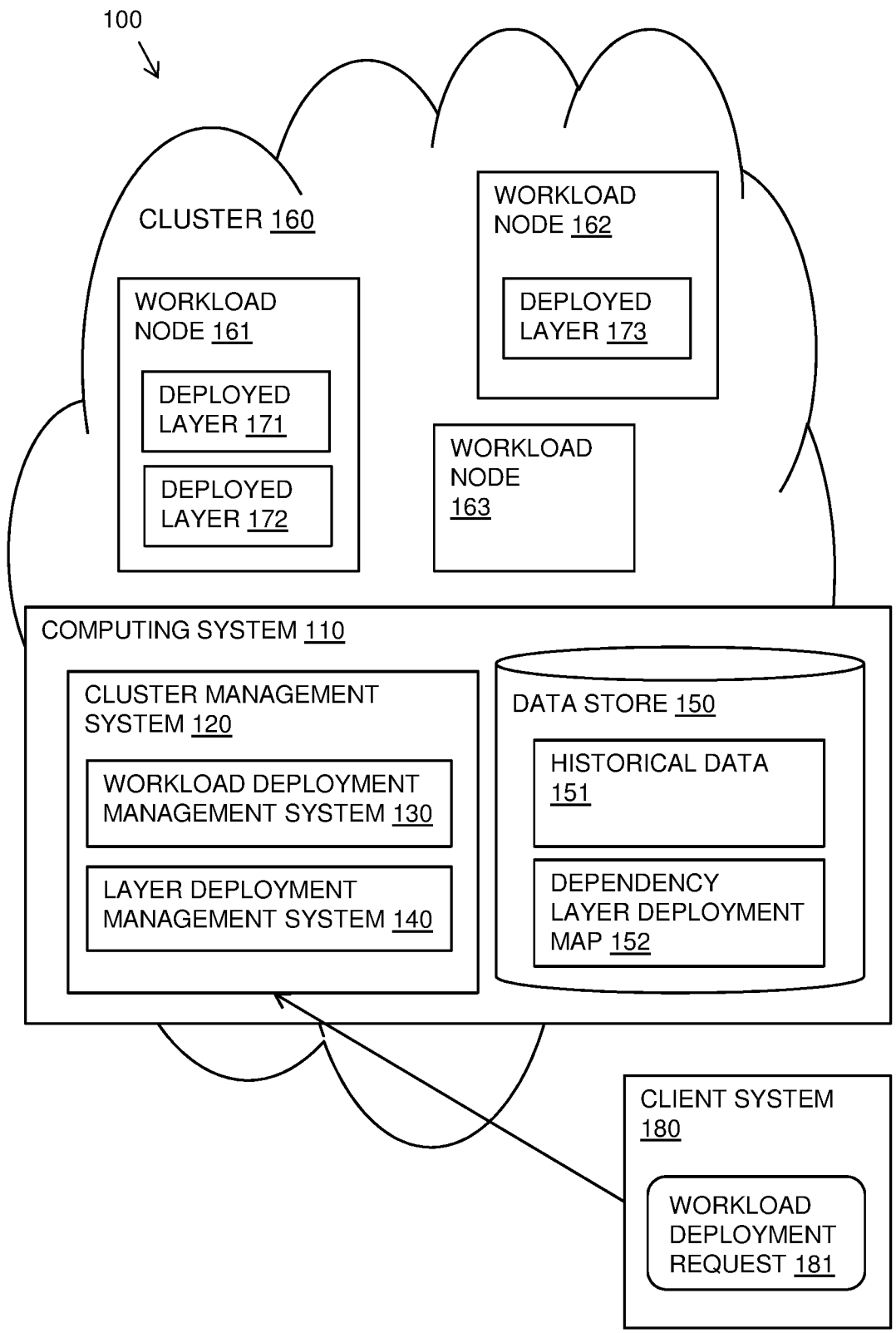
FIG. 1 is a schematic diagram of an example embodiment of a system in accordance with the present invention.

Referring to FIG. 1, a schematic diagram shows an example embodiment of a system 100 in which the described system and method may be implemented. A cluster 160 of workload nodes 161, 162, 163 may be provided across which workload deployment requests 181 from a client system 180 for a workload program may be executed. Workload programs may require one or more dependency layers 171, 172, 173 to be deployed across the workload nodes 161, 162, 163 of the cluster 160 for execution of the workload. Dependency layers define support programs on which a workload program depends.

An example deployment may have: a base operating system layer, an additional components layer with extensions to the standard operating system, a middleware layer (for example, with web development servers, databases, message buses), and an application layer that has the actual code that defines a workload program.

In an example implementation, the workload node cluster 160 may provide a virtualization system including containers and the dependency layers define required components. In another example implementation, the workload node cluster 160 is a virtualization system as a Platform-as-a-Service (PaaS) and the dependency layers are packages defining required components.

The described method and system provide a dependency layer deployment optimization for deployment and/or reclaiming dependency layers across a workload node cluster 160. The optimization is based on analysis of historical workload deployment requests and deployed dependency layers for the workload deployment requests to predict layer deployment requirements in the cluster 160.

A cluster management system 120 may be provided on a computing system 110 that manages the workload node cluster 160. The cluster management system 120 may include a workload deployment management system 130 for deploying workload deployment requests in the cluster 160 and collecting historical data 151 relating to the workload deployment requests that is stored in a data store 150. The cluster management system 120 may include a layer deployment management system 140 for optimizing the deployment and/or reclaiming of dependency layers and may maintain a dependency layer deployment map 152 in a data store 150.

A deployment path uses a workload deployment management system 130 to receive a request to deploy a workload program, along with a dependency layer list. Using the dependency layer deployment map 152 a workload node is identified that has the correct set of dependency layers or required dependency layers are installed on a node, ahead of actually deploying the workload to that node. The workload deployment request and any resulting layer deployments that were required are stored in the historical data 151 for later analysis.

In order to make the above deployment step more efficient or optimize for the specific goals set for the cluster, the layer deployment management system 140 is continually analyzing the historical data 151 to see how better to optimize the dependencies layers that are deployed and stored in the dependency layer deployment map 152.

For the purpose of this description the term "layer" is defined to describe either the layers needed to run a container workload or the packages or build packs needed to run a PaaS workload. These aspects are enabled by the analysis of the layer descriptions that are provided by the packaging of containers or PaaS workloads, along with their frequency and time of use, so as to generate the optimal layer deployment across the cluster to support the workloads being requested, both currently and in the future.

Figure 2:
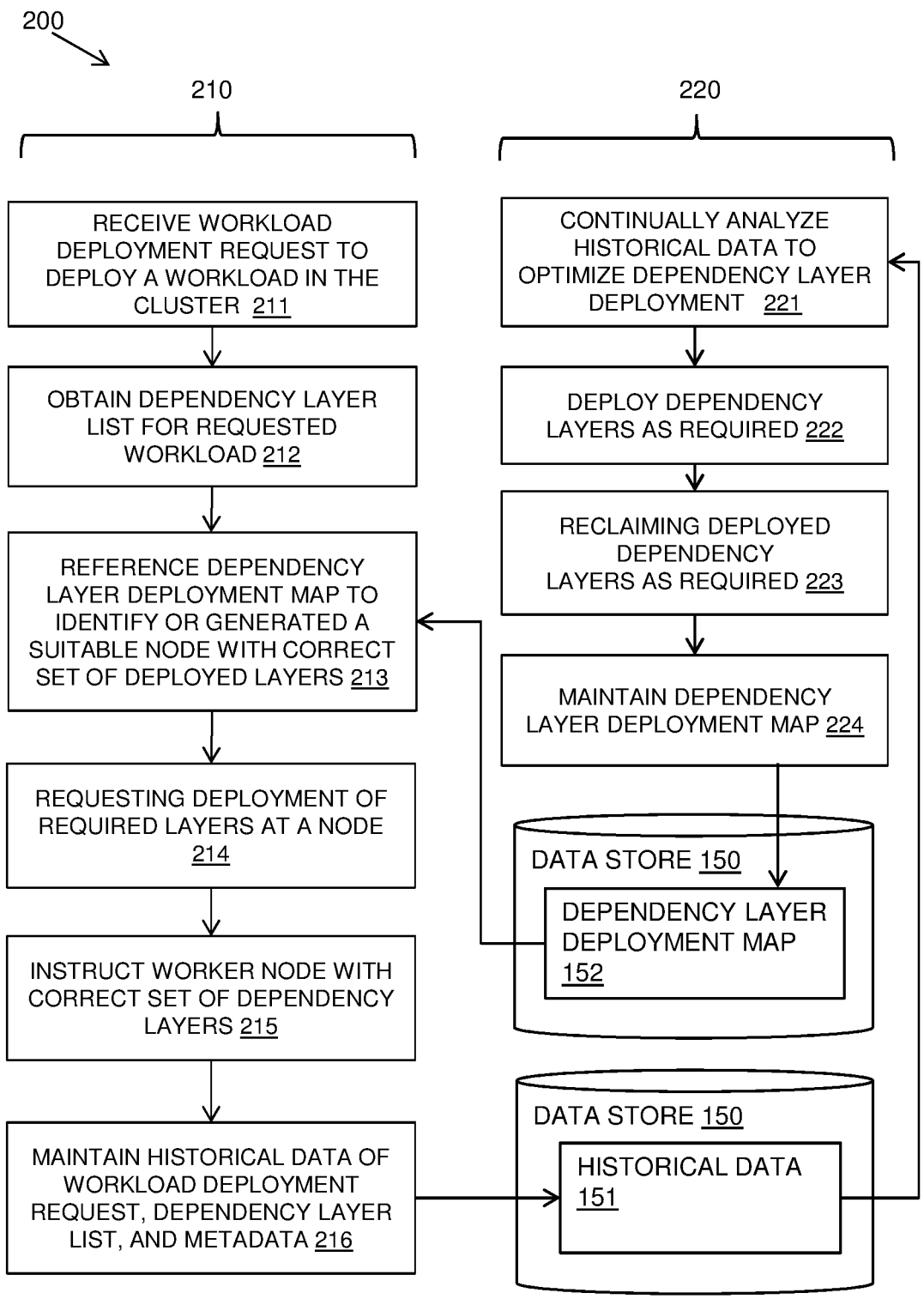
FIG. 2 is a flow diagram of an example embodiment of a method in accordance with the present invention.

Referring to FIG. 2, a flow diagram 200 shows an example embodiment of the described method in a workload node cluster formed of a plurality of interconnected data processing nodes.

The method includes two processes that may run in parallel; a first process 210 receives and deploys workload deployment requests in the workload node cluster using dependency layers deployed at a node, whilst a second process 220 analyzes historical data from the workload deployment requests and optimizes deployed dependency layers in the workload node cluster for current and future workload deployment requests.

In the first process 210, the method may receive 211 a workload deployment request to deploy a workload in the cluster.

A list of dependency layers required for the requested workload is obtained 212. The workload deployment request may explicitly include a layer dependency list or from a layer dependency list may be deduced from the workload deployment request.

The method may reference 213 a dependency layer deployment map 152 to identify or generate a suitable node in the cluster with a correct set of deployed layers. If a node with the required deployed layers does not exist, the method may generate a suitable node by requesting 214 deployment of the required dependency layers in the node.

The identified or generated node with the correct set of dependency layers may be instructed 215 to carry out the workload deployment request.

Historical data 151 of the workload deployment request and the list of dependency layers required for the request may be maintained 216 by storing the data as historical data 151 in a data store 150. Statistics and metadata relating to the workload deployment request and the dependency layers may also be stored in the historical data 151. The workloads and dependency layer may be identified by their Name, Version, and (optionally) Label (for example, Name, Version: 13.1.2, Label: "Our Latest Build").

In parallel with the processing of workload deployment requests 211 in the cluster, the second process 220 may continually or regularly analyze 221 the historical data 151 to optimize dependency layer deployment in the nodes of the cluster by generating predictions of dependency layers required in the workload node cluster at given times by predicting the requirements of current and future workload deployment requests.

This may include deploying 222 dependency layers where and when required in the cluster and/or reclaiming 223 deployed dependency layers, for example, by garbage collection of deployed dependency layers according to the predictions.

As dependency layers are deployed and reclaimed, a dependency layer deployment map 152 is maintained 224 in a data store 150 indicating a current deployment of dependency layers in the nodes of the cluster.

In an example embodiment, the map may be a database of rows, where each row contains: Node ID, Dependency Layer ID, Date/Time of Deployment. The Dependency Layer ID may be an index into a database of Deployment Layers that are known by the cluster, whether they are currently deployed on a node or not. The data stored for each Dependency Layer may be at least its Name, Version, and (optionally) Label.

Analyzing 221 the historical data may include analyzing the historical data to generate predictions of dependency layers includes recognizing and applying patterns of workload deployment requests.

Common dependency lists patterns may be identified, along with their frequency and time of request. For example, if the dependency list of A→B→C→D occurs frequently, with A→B→C→D plus additionally E slightly less frequently and the time to deploy layer E is large, then dependency layers may be deployed to keep a number of nodes with the full set of dependency layers A, B, C, D and E on them. Additionally, garbage collection may not be allowed to remove dependency layer E even though its frequency is less. This will optimize flexibility of which node on which to place workloads that have either of these two dependency lists without a performance delay for the workloads that need E.

If certain dependency lists are more frequent at certain times of day/week/year, then the analysis may allow layer garbage collection to remove any of these components, provided they are not also used in other, non-time-dependent lists at other times, but re-deploy them ahead of such predicted usage.

Garbage collection for dependency layers across a cluster is important to ensure worker nodes do not become bloated. By using the historical data, cluster management can more effectively decide which components to keep and which to remove, balancing the needs of expected workloads.

Analyzing 221 the historical data may include analyzing the historical data to generate predictions of dependency layers includes analyzing and predicting growth.

By analyzing the historical growth in usage over time of new versions of specific components in layers, the analysis may predict ahead of demand the dependency lists that will be needed to meet the previously experienced growth curve. For example, what the curve of replacement is like when version 4.3 of component X replaces version 4.2 when used in a dependency list. It is noted that this is not just about where 4.3 of X is deployed, but ensuring any new dependencies of 4.3 (that were not required by version 4.2) are also deployed on the same nodes.

Analyzing 221 the historical data may include analyzing the historical data to generate predictions of dependency layers includes analyzing and predicting updates and/or bug reports.

By responding to security updates and bug reports, the deployed layers may be optimized for safety and security. For instance, a recently released security patch can be deployed to relevant deployed components. Equally importantly, incompatibilities between versions of components can be fixed. For instance, if it is known that version 8 of component F has a problem with version 6 and earlier of component G that it depends on, then the analysis can identify where such incompatible combinations of layers with a list have been deployed and update the version of G to a newer version accordingly, ahead of any workload being affected by it.

In summary, by applying analytics to the dependency layer in lists, the cluster can automatically improve its performance and resilience ahead of any given workload being deployed.

Figure 3:
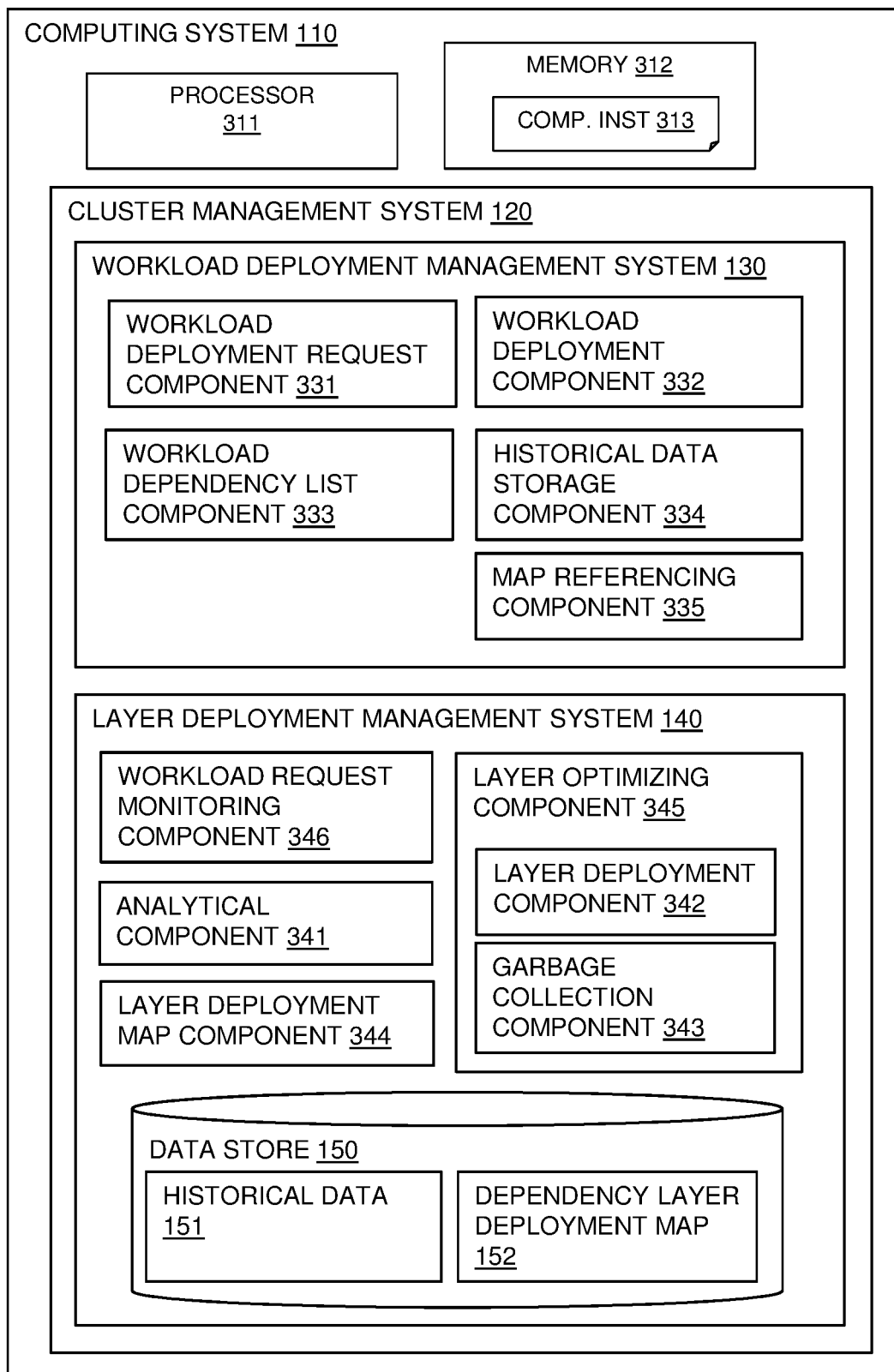
FIG. 3 is block diagram of an example embodiment of a system in accordance with the present invention.

Referring to FIG. 3, a block diagram shows an example embodiment of the described system in a computing system 110 associated with and connected to a workload node cluster of nodes and providing the described functionality of the cluster management system 120.

In example embodiments, the cluster management system 120 may be used in a virtualization system including containers with dependency layers defining required components or as a Platform-as-a-Service with dependency layers being packages defining required components.

The computing system 110 may include at least one processor 311, a hardware module, or a circuit for executing the functions of the described components which may be software units executing on the at least one processor. Multiple processors running parallel processing threads may be provided enabling parallel processing of some or all of the functions of the components. Memory 312 may be configured to provide computer instructions 313 to the at least one processor 311 to carry out the functionality of the components.

The cluster management system 120 may include a workload deployment management system 130 for handling workload deployment requests to the cluster and a layer deployment management system 140 for optimizing deployment of dependency layers in the cluster as described. However, a single integrated system may include the functionality of these systems or they may be spread across two or more systems.

The workload deployment management system 130 may include a workload deployment request component 331 for receiving a workload deployment request from a client for execution of a workload program that is dependent on one or more dependency layers of support programs.

The workload deployment management system 130 may include a workload dependency list component 333 for obtaining a list of dependency layers required for the workload deployment request. The workload deployment request received at the workload deployment request component 331 may include data indicative of a dependency list listing each support program on which the workload program depends or may include data from which a layer dependency list can be deduced.

The workload deployment management system 130 may include a workload deployment component 332 for selecting a node in the cluster on which to deploy the workload program.

The workload deployment management system 130 may include a map referencing component 335 for referencing a maintained map 152 of currently deployed dependency layers across the nodes of the workload node cluster to determine a node with the correct set of deployed layers for the workload deployment request. The map referencing component 335 may determine a node with the correct set of deployed layers for the workload deployment request by deploying one or more required layers to a node. The map 152 may be maintained by the layer deployment management system 140 described further below.

The workload deployment management system 130 may include a historical data storage component 334 for maintaining historical data 151 in a storage medium 150 of workload deployment requests to the workload node cluster and a list of dependency layers for the workload deployment requests. The historical data storage component 334 may store dependency lists corresponding to workloads previously deployed on the network and data indicative of the utility thereof. This may include metadata and statistics relating to the workload deployment requests and/or dependency lists including: developer, team, organization, individual component, frequency and time of use, etc.

The layer deployment management system 140 may include functionality that runs in parallel with the workload deployment management system 130 including a workload deployment request monitoring component 346.

The layer deployment management system 140 may include a layer deployment map component 344 for maintaining the map 152 in a data store 150 of currently deployed dependency layers across the nodes of the workload node cluster. The map 152 may store data indicative of which dependency layer support program is presently deployed on which node.

The layer deployment management system 140 may include an analytical component 341 for analyzing the stored historical data 151 to generate predictions of dependency layers required in the workload node cluster at given times.

The analytical component 341 may generate a recommended set of dependency layer support programs present on nodes of the cluster for supporting the workload programs based on data received from the workload deployment management system 130 including the workload deployment request component 331, from the layer deployment map 152, and from the historical data 151.

The analytical component 341 may run continuously by analyzing the historical data 151 to generate predictions of required dependency layers by recognizing and applying patterns of workload deployment requests, by analyzing and predicting growth, and/or analyzing and predicting updates and/or bug reports.

The analytical component 341 may instruct a layer optimizing component 345 to deploy and/or reclaim dependency layers in the workload node cluster according predictions of the analysis. The layer optimizing component 345 may include a layer deployment component 342 for deploying dependency layers and a garbage collection component 343 for reclaiming dependency layers using garbage collection of resources used by the dependency layers based on recommendations of the analytical component 341.

The layer deployment map component 344 may update the data stored in the dependency layer deployment map 152 according to layer deployments or garbage collections.

The analytical component 341 may also use information from a current workload deployment request together with the historical data to produce a current recommended set of dependencies across the worker nodes for the workload deployment component 332.

An example deployment path is when the workload deployment request component 331 receives a request to deploy a workload, along with the dependency layer list. It will call the workload deployment component 332, which will, using the dependency layer deployment map 152, find a worker node that has the correct set of dependencies or use the layer deployment component 342 to install them on a node, ahead of actually deploying the workload to that node. The workload deployment request component 331 will also store the request and any resulting layer deployments that were required in the historical data 151 for later analysis.

Existing art may choose where to deploy a workload at the time of the deployment request. The described method and system simplify this decision by attempting to ensure that nodes are ready with all the required dependency layers already deployed.

There may be known intelligent placement algorithms that place workloads on the cluster and these may run in conjunction with the described method and system in order to balance efficiency of placement algorithm versus available resources.

Described method runs out of band at some frequency to balance the capabilities of the cluster ready for a projected set of placement decisions that might arrive in the future.

The described management of clusters aims to ensure better placement of workloads where they can be run most efficiently, deployment of the software layers ahead of time so to further maximize runtime performance, and lastly knowledge of when they can remove such layers when they are no longer needed.

The method and system aims to ensure that any dependent layers or packages required by an application are already deployed ahead of the deployment of the application that needs them in order to accelerate the development and deployment lifecycle.

Further, to intelligently manage such a cluster, it would be beneficial to know about what types of layers or packages are used together, in what frequency so that an optimal spread of such items is possible, and a cluster would know when to garbage collect unused layers or packages.

Figure 4:
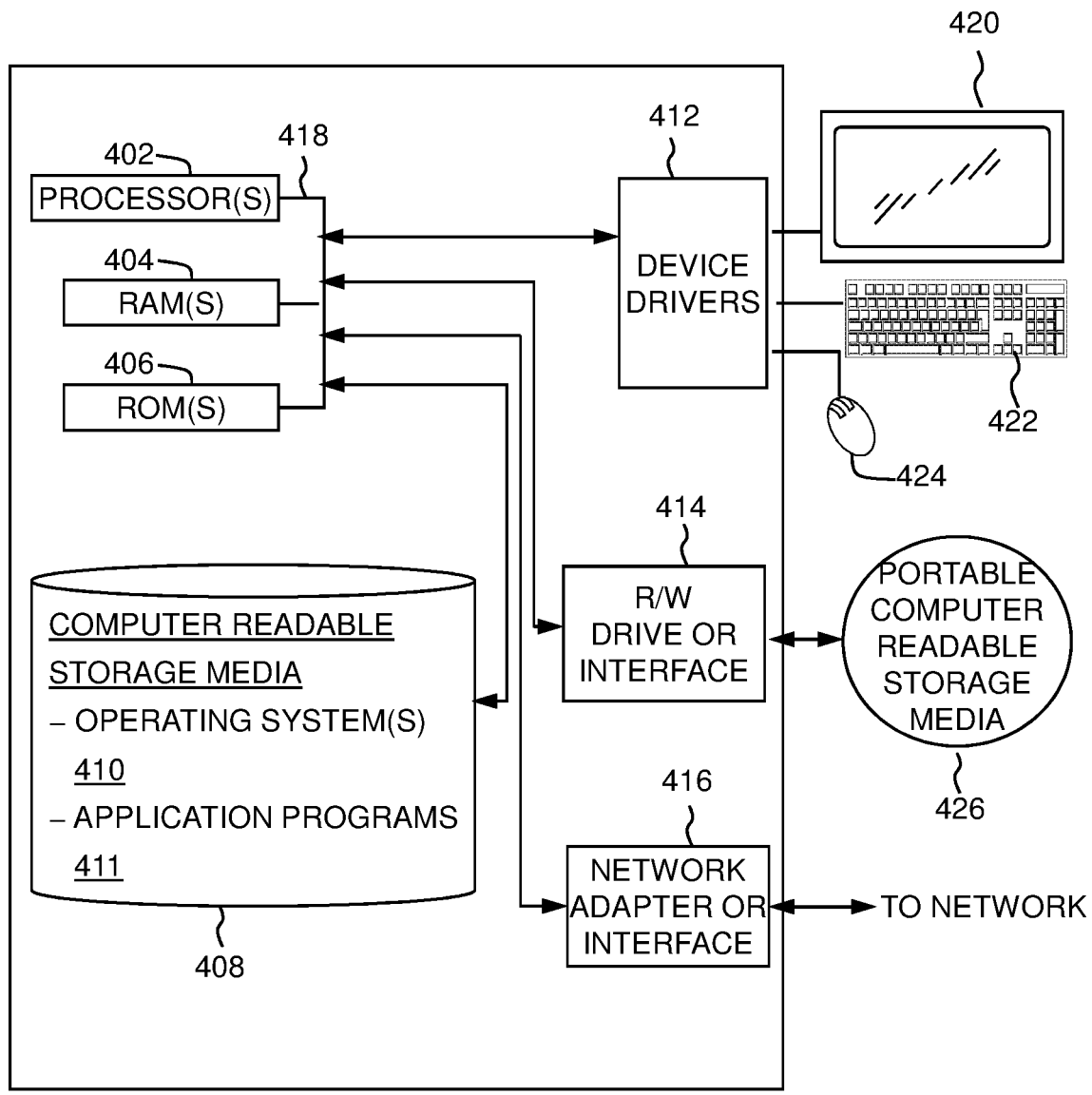
FIG. 4 is a block diagram of an embodiment of a computer system or cloud server in which the present invention may be implemented.

FIG. 4 depicts a block diagram of components of the computing device 110 of the system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as a cluster management system 120 including a workload deployment system 130 and a layer deployment management system 140, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 110 can also include a R/W drive or interface 414 to read from and write to one or more portable computer readable storage media 426. Application programs 411 on computing device 110 can be stored on one or more of the portable computer readable storage media 426, read via the respective R/W drive or interface 414 and loaded into the respective computer readable storage media 408.

Computing device 110 can also include a network adapter or interface 416, such as a TCP/IP adapter card or wireless communication adapter. Application programs 411 on computing device 110 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device 110 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
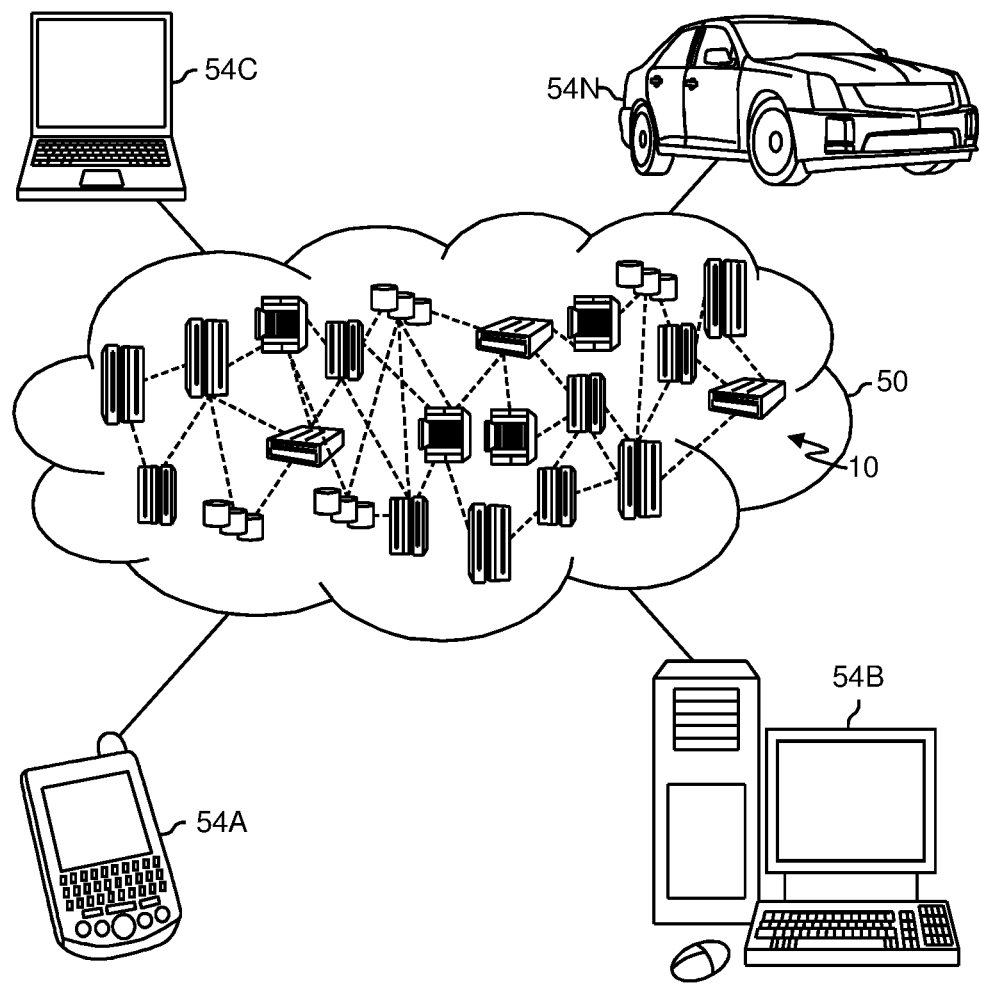
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
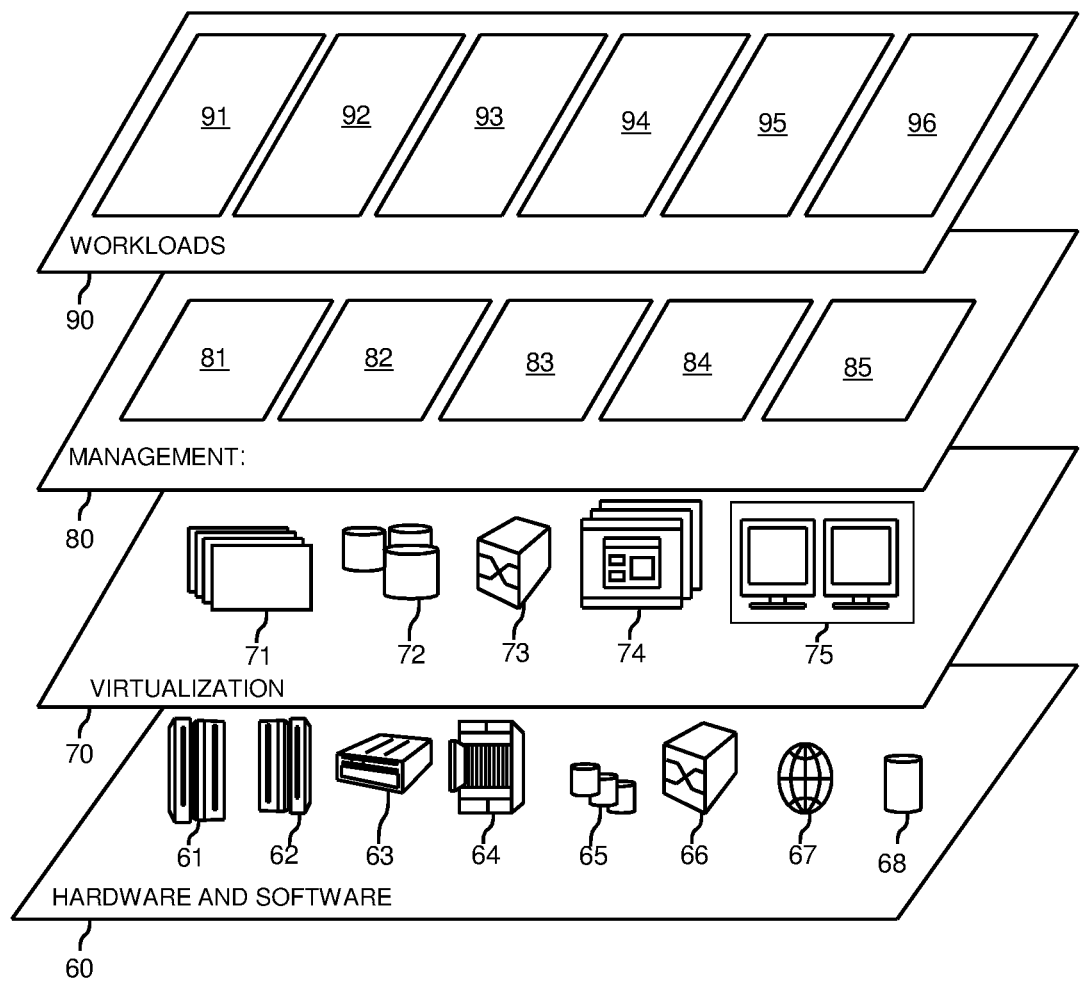
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dependency layer deployment optimization processing 96 for workload node clusters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dependency layer deployment optimization in a workload node cluster, the method comprising:

maintaining historical data of workload deployment requests to a workload node cluster and a list of dependency layers for the workload deployment request, wherein a dependency layer defines support programs on which a workload program depends;

maintaining a map of currently deployed dependency layers across nodes of the workload node cluster;

analyzing the historical data to generate a prediction of dependency layers required in the workload node cluster at each of a plurality of given times by predicting requirements of future workload deployment requests; and deploying and/or reclaiming dependency layers in the workload node cluster according to the predictions ahead of a workload deployment request requiring predicted dependency layers.

2. The method as recited in claim 1, wherein the reclaiming dependency layers use garbage collection of resources used by the dependency layers.

3. The method as recited in claim 1, wherein the maintaining of historical data of workload deployment requests comprises metadata and statistics relating to the request.

4. The method as recited in claim 1 further comprising:

monitoring for a workload deployment request;

obtaining a list of dependency layers required for the workload deployment request; and storing data relating to the workload deployment request and the list of dependency layers as historical data.

5. The method as recited in claim 1, wherein the analyzing of the historical data to generate said prediction of dependency layers comprises recognizing and applying patterns of workload deployment requests.

6. The method as recited in claim 1, wherein the analyzing of the historical data to generate said prediction of dependency layers comprises analyzing and predicting growth.

7. The method as recited in claim 1, wherein the analyzing of the historical data to generate said prediction of dependency layers comprises analyzing and predicting updates and/or bug reports.

8. A computer program product for dependency layer deployment optimization in a workload node cluster, the computer program product comprising a computer readable storage medium having program code embodied therewith, the program code comprising the programming instructions for:

maintaining historical data of workload deployment requests to a workload node cluster and a list of dependency layers for the workload deployment request, wherein a dependency layer defines support programs on which a workload program depends;

maintaining a map of currently deployed dependency layers across nodes of the workload node cluster;

analyzing the historical data to generate a prediction of dependency layers required in the workload node cluster at each of a plurality of given times by predicting requirements of future workload deployment requests; and deploying and/or reclaiming dependency layers in the workload node cluster according to the predictions ahead of a workload deployment request requiring predicted dependency layers.

9. The computer program product as recited in claim 8, wherein the reclaiming dependency layers use garbage collection of resources used by the dependency layers.

10. The computer program product as recited in claim 8, wherein the maintaining of historical data of workload deployment requests comprises metadata and statistics relating to the request.

11. The computer program product as recited in claim 8, wherein the program code further comprises the programming instructions for:
   monitoring for a workload deployment request;
   obtaining a list of dependency layers required for the workload deployment request; and
   storing data relating to the workload deployment request and the list of dependency layers as historical data.

12. The computer program product as recited in claim 8, wherein the analyzing of the historical data to generate said prediction of dependency layers comprises recognizing and applying patterns of workload deployment requests.

13. The computer program product as recited in claim 8, wherein the analyzing of the historical data to generate said prediction of dependency layers comprises analyzing and predicting growth.

14. The computer program product as recited in claim 8, wherein the analyzing of the historical data to generate said prediction of dependency layers comprises analyzing and predicting updates and/or bug reports.

15. A system, comprising:
   a memory for storing a computer program for dependency layer deployment optimization in a workload node cluster; and
   a processor connected to said memory, wherein said processor is configured to execute the program instructions of the computer program comprising:
      maintaining historical data of workload deployment requests to a workload node cluster and a list of dependency layers for the workload deployment request, wherein a dependency layer defines support programs on which a workload program depends;
      maintaining a map of currently deployed dependency layers across nodes of the workload node cluster;
      analyzing the historical data to generate a prediction of dependency layers required in the workload node cluster at each of a plurality of given times by predicting requirements of future workload deployment requests; and
      deploying and/or reclaiming dependency layers in the workload node cluster according to the predictions ahead of a workload deployment request requiring predicted dependency layers.

16. The system as recited in claim 15, wherein the reclaiming dependency layers use garbage collection of resources used by the dependency layers.

17. The system as recited in claim 15, wherein the maintaining of historical data of workload deployment requests comprises metadata and statistics relating to the request.

18. The system as recited in claim 15, wherein the program instructions of the computer program further comprise:
   monitoring for a workload deployment request;
   obtaining a list of dependency layers required for the workload deployment request; and
   storing data relating to the workload deployment request and the list of dependency layers as historical data.

19. The system as recited in claim 15, wherein the analyzing of the historical data to generate said prediction of dependency layers comprises recognizing and applying patterns of workload deployment requests.

20. The system as recited in claim 15, wherein the analyzing of the historical data to generate said prediction of dependency layers comprises analyzing and predicting growth.

* * * * *